United States Patent [19]
Plummer

[11] 3,895,180

[45] July 15, 1975

[54] GREASE FILLED CABLE SPLICE ASSEMBLY

[76] Inventor: Walter A. Plummer, 3546 Crownridge Dr., Sherman Oaks, Calif. 91403

[22] Filed: Sept. 16, 1974

[21] Appl. No.: 506,598

Related U.S. Application Data

[63] Continuation-in-part of Ser. No. 347,435, April 3, 1973, Pat. No. 3,836,702.

[52] U.S. Cl. .................... 174/92; 174/22; 174/76
[51] Int. Cl. ............................................. H02g 15/08
[58] Field of Search .................... 174/91–93, 174/76, 77 R, 22, 23 C, 23 R; 156/49, 51, 53; 339/115 R, 115 C, 116 R

[56] References Cited
UNITED STATES PATENTS

| | | | |
|---|---|---|---|
| 2,930,835 | 3/1960 | Bollmeier | 174/92 X |
| 3,619,481 | 11/1971 | Smith | 174/93 X |
| 3,836,694 | 9/1974 | Kapell | 174/22 |
| 3,836,702 | 9/1974 | Plummer | 172/92 |

Primary Examiner—Darrell L. Clay
Attorney, Agent, or Firm—Spensley, Horn & Lubitz

[57] ABSTRACT

A grease filled cable splice assembly for enclosing and protecting one or more spliced conductors in a cable is disclosed. The assembly comprises an inner cover disposed around the spliced conductors, and an outer jacket enclosing the inner cover and the conductors. A grease is disposed in the inner cover and an insulative foam material is disposed between the inner cover and outer jacket. The outer jacket has a valve secured thereto which enables a liquid foam material to be injected into the jacket. The liquid foam material, after expanding and hardening, forms a relatively solid insulating mass. A suitable grease is pumped into the inner cover by means of a first tube inserted at one end of the inner cover until it exudes from a second tube at the other end of the cover. The assembly thus formed protects the joints of the spliced conductors in the cable from the environment.

16 Claims, 11 Drawing Figures

PATENTED JUL 15 1975 3,895,180
SHEET 1
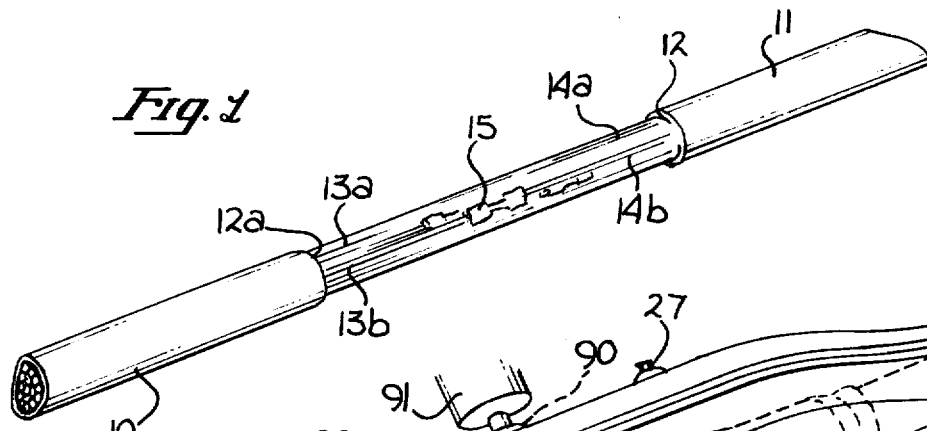
Fig. 1
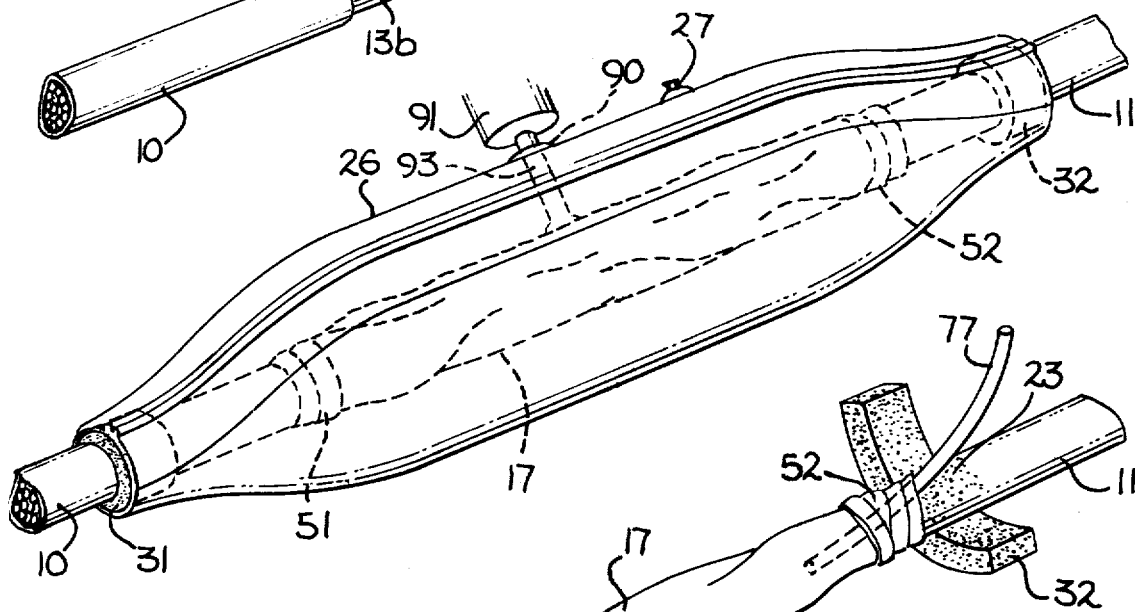
Fig. 11
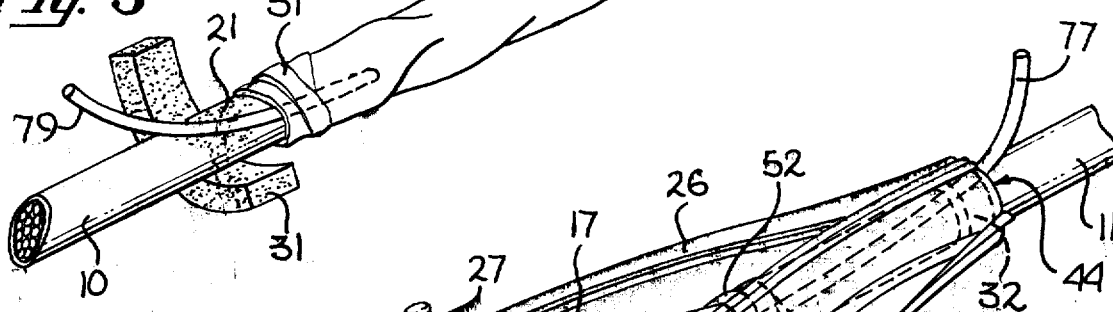
Fig. 3
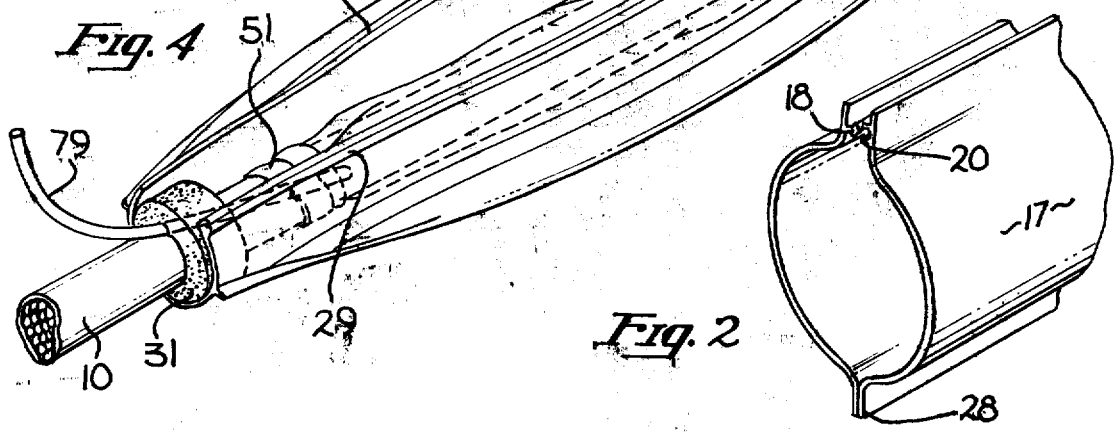
Fig. 4
Fig. 2

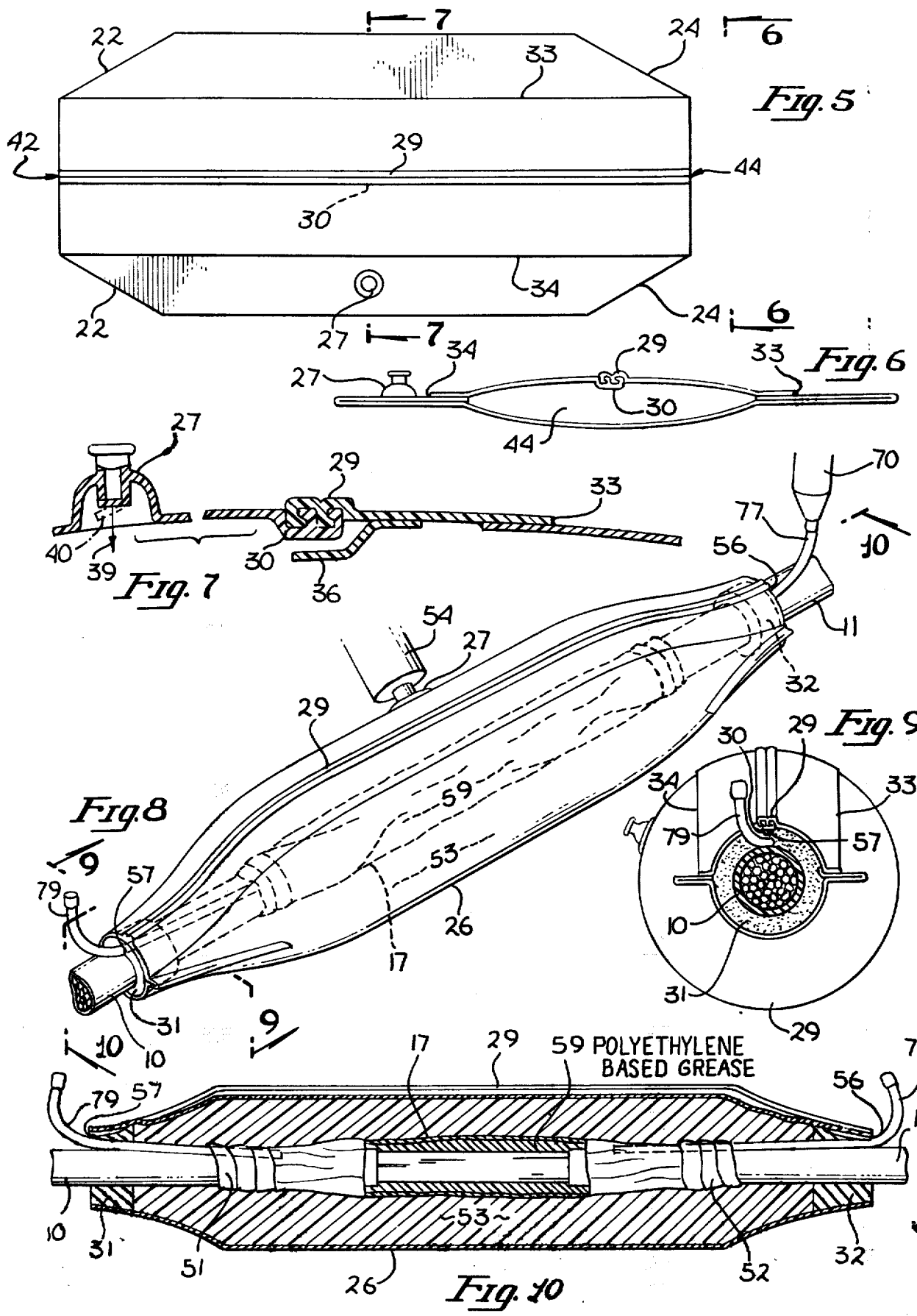

GREASE FILLED CABLE SPLICE ASSEMBLY

BACKGROUND OF THE INVENTION

This application is a continuation-in-part application of my earlier copending application, Ser. No. 347,435, filed on Apr. 3, 1973, now U.S. Pat. No. 3,836,702.

1. Field of the Invention

This invention relates to the field of cable splice protection and insulation means, and more particularly, to a grease filled cable splice assembly used to protect cables containing a plurality of spliced conductors.

2. Prior Art

Cables which contain a plurality of conductors, such as telephone cables, often require splicing, that is, the connection of one conductor to another. Typically, cables comprising a plurality of individual conductors, especially those used as telephone cables, are often buried in the ground or suspended from poles and, therefore, any splice therein must be capable of withstanding a variety of environmental conditions. There have been many prior art attempts to protect such splices, but they all contain a number of shortcomings. One prior art method consists of wrapping the entire splice area with tape until there are no exposed conductors. However, this splice assembly does not insure the integrity of the splice in that tape is susceptible to the surrounding environment and is not usually as strong as the original cable covering material.

Another prior art method is disclosed in Wright, II, U.S. Pat. No. 2,452,823. Wright II shows multiple coverings of copper, tape, insulant, wire, and vulcanizable rubber over a desired conductor to form a cable splice. While this assembly is fairly effective to protect the cable splice from the elements, it is complex, requires special purpose machinery, and is time consuming.

Yet another prior art assembly is disclosed by Bollmeier et al. in U.S. Pat. No. 2,967,795. Bollmeier et al. teach wrapping the conductors in wire mesh and tape. The wrapped conductors are then put in a plastic envelope which is filled with a liquid resinous material such as asphalt. This assembly is also complex and costly.

Thus the prior art assemblies are either ineffective, e.g. merely wrapping the splice with tape, or are somewhat effective, but are complex and costly. The present invention is a further improvement of the invention disclosed in my copending application Ser. No. 347,435 which taught one means to overcome the shortcomings of the prior art. In the present invention, grease is injected into the inner cover so as to completely surround the spliced conductors. Because grease is an effective water repellant and relatively inexpensive, excellent protection of the spliced conductors is achieved.

Thus the present invention provides a splice assembly which may be either temporary or permanent, and which is easy to install and inexpensive. In addition, the present invention provides excellent protection for the conductors from the elements.

SUMMARY OF THE INVENTION

A grease filled cable splice assembly is described particularly adaptable for enclosing and protecting spliced cables, such cables typically comprising a plurality of conductors. This invention comprises:

i. an inner cover disposed about the spliced conductors. The inner cover is a generally elongated flexible plastic member having a first pair of interlocking tracks fixedly secured to corresponding edges along the length of the cover. The tracks providing a means for securing the inner cover circumferentially about the conductors;

ii. a means for injecting a grease into the inner cover, for example, one or more tubes disposed in the inner cover;

iii. a protective grease material disposed within the enclosed volume of space defined by the inner cover and the conductors. The grease serves to help protect the conductors from the elements such as air and water;

iv. an outer jacket disposed about the inner cover and the conductors. The outer jacket comprised of a generally flexible plastic member having end apertures through which the conductors may pass, and a second pair of interlocking tracks fixedly secured along the length of the jacket. The tracks enable the outer jacket to be slipped around the conductors and the inner cover. The outer jacket also has at least one unidirectional valve; i.e. a valve which allows a liquid to pass from the exterior to the interior of the jacket;

v. a means for sealing the apertures in the outer jacket, for example, porous gaskets; and vi. an insulative foam material disposed within the outer jacket.

It is therefore one object of the present invention to provide a grease filled cable splice assembly which protects spliced conductors from corrosion and other environmental hazards.

Another object of the present invention is to provide a splice assembly which is strong, rugged, yet inexpensive and easy to use.

The novel features which are believed to be characteristic of the invention, both as to its organization and method of operation, together with further objectives and advantages thereof, will be better understood from the following description considered in connection with accompanying drawings in which a presently preferred embodiment of the invention is illustrated by way of example. It is to be expressly inderstood, however, that the drawings are for the purpose of illustration and description only and not intended as a definition of the limits of the invention.

BRIEF DESCRIPTION OF THE DRAWINGS

FIG. 1 is a perspective view of a first cable spliced to a second cable, each cable comprising a plurality of conductors.

FIG. 2 is a partial perspective view of the inner cover showing the interlocking tracks along its edge.

FIG. 3 is a perspective view of a partially assembled cable splice assembly showing the inner cover disposed about the spliced conductors, grease tubes inserted inside the inner cover at each end thereof and foam barriers.

FIG. 4 is a perspective view of the cable splice assembly of FIG. 3 with the addition of the outer jacket.

FIG. 5 is a plan view of the outer jacket.

FIG. 6 is a end view of the outer jacket taken from section line 6—6 of FIG. 5.

FIG. 7 is a partial cross sectional view of the outer jacket taken through section lines 7—7 of FIG. 5 to illustrate the valve and interlocking tracks.

FIG. 8 is a perspective view of the cable splice assembly showing the outer jacket of FIG. 4 completely closed the liquid foam material being injected through FIG. 9 is an end view of the cable splice assembly of FIG. 8 taken along lines 9—9.

FIG. 10 is a cross sectional view of the completed cable splice assembly taken through section lines 10—10 of FIG. 8.

FIG. 11 is a perspective view of the cable splice assembly showing the outer jacket of FIG. 4 completely closed and a grease being injected directly into the inner cover through a second valve in the outer jacket.

DETAILED DESCRIPTION OF THE INVENTION

Referring first to FIG. 1, there is shown, as a presently preferred embodiment, a cable 10 which includes a plurality of insulated conductors 13a and 13b and a second cable 11 with insulated conductors 14a and 14b. The conductors are typically contained within a cover 12 made of a strong flexible material such as rubber and the like. In FIG. 1, cables 10 and 11 are shown with the insulation 12 and 12a stripped away to expose the inner conductors 13a and 13b, and 14a and 14b respectively. These conductors are spliced to each other, by conventional means, such as solder, welding, or connectors, so as to insure a good electrical connection. In FIG. 1, conventional crimp connectors 15 are shown as the means for splicing the conductors 13 and 14 within the cables 10 and 11.

After proper splicing of the conductors 13 and 14, an inner cover 17, shown in FIG. 2, is disposed about the plurality of conductors. The inner cover 17 is a generally elongated, flexible plastic member fabricated from two sheets of polyolefin, polyvinyl chloride or other suitable material. The two sheets are joined along the length of one pair of edges to form a seam 28. The other edges of the sheet have a pair of interlocking tracks 18 and 20 fixedly secured along their length. In one embodiment the interlocking tracks 18 and 20 are secured to the inner cover 17 by heat fusion or other attaching means, or they may be fabricated as part of the inner cover 17 utilizing known extrusion techniques. In the presently preferred embodiment, the interlocking tracks 18 and 20 are similar to those disclosed in U.S. Pat. No. 2,960,561. Other inner covers such as a sleeve or a wrapping of material, are also within the scope of this invention.

In this manner, the inner cover 17 is closed circumferentially about the conductors 13 and 14 as indicated in FIG. 3. The ends of the inner cover 17 extend beyond the area where the conductors have been spliced and are secured to corresponding cables 10 and 11 with an attaching means, such as tape 51 and 52. However, before the ends are so secured, means are first disposed in or through the inner cover 17 so that a protective grease material may be injected therein, as described hereinbelow. In the presently preferred embodiment, the means for injecting grease comprises two tubes, 77 and 79, disposed in the inner cover 17, one tube at each end thereof. Either tube can be used to inject a protective grease material into the volume defined by the inner cover 17 and the cables 10 and 11, while the other tube provides a port for any excess material pumped into the aforesaid volume. The tape 51 and 52, used to secure the ends of the inner cover 17 to the cables 10 and 11, also secure the tubes 77 and 79 to the cables. In another embodiment hereinafter discussed, and shown in FIG. 11, the protective grease material is injected directly into the center of inner cover 17, through an outer valve 90 and a tube 93 through which valve 90 communicates with the inner cover 17.

With reference to FIGS. 4 and 8, an outer jacket 26 is shown disposed about the inner cover 17 and extending beyond the ends of inner cover 17 to the outer surface of cables 10 and 11 such that the entire inner cover is completely enclosed. Note, however, that the tubes 77 and 79 are allowed to protrude beyond the ends of the outer jacket 26 such that the protective grease material may be pumped into the inner cover 17 after the outer jacket is secured thereabout. The outer jacket 26, shown in FIGS. 5 and 6, is a generally cylindrical flexible plastic member having first and second tapered ends 22 and 24. The tapered ends aid in forming a seal between the cables and the outer jacket 26. These ends also form the apertures 42 and 44 shown in FIGS. 4, and 5 through which the cables pass.

The outer jacket 26 may be fabricated from a material such as described for inner cover 17. The plastic may be transparent enabling a visual inspection of the injected foam, or colored, enabling a coding of the splice assemblies used for various cables. In the presently preferred embodiment, outer jacket 26 is a transparent plastic material, somewhat thicker than that utilized for inner cover 17. As seen clearly in FIGS. 6 and 7, the interlocking tracks 29 and 30 allow the outer jacket to be slipped over the cables and then secured in place. The interlocking tracks are similar to those known in the prior art, such as described for the inner cover 17. The interlocking tracks may be secured to the outer jacket 26 by heat fusion forming seams 33 and 34, or may be fabricated as part of the outer jacket via known extrusion techniques.

A valve 27 is mounted to the outer jacket 26 to allow a liquid to be injected into the interior of the outer jacket. The valve 27 has a gate means 40 shown in FIG. 7 which allows the liquid to flow only in the direction 39. In the presently preferred embodiment valve 27 is a check valve, but other valves capable of the same flow control are within the scope of this invention, such as those having a cross-slit, flexible disk, or semispherical member. A flap 36 may be positioned on the inner surface of the outer jacket 26 in the area near the interlocking tracks 29 and 30 to prevent the expanding foam from contacting the interlocking tracks. Keeping the tracks of the outer jacket 26 relatively free of the foam facilitate removal of the jacket as may be required for further repair or inspection. This flap may be plastic and extends longitudinally over the length of the tracks.

Before the outer jacket 26 is placed over the inner cover 17 and cables 10 and 11, FIG. 3 indicates that a section 21 of cable 10 and a section 23 of cable 11 are cleaned and then roughened, for example, with a steel brush. A pair of sealing means for example, gaskets 31 and 32, which may be a resilient sponge-like material, are placed about the sections 21 and 23. These gaskets are placed over the tubes 77 and 79 in the presently preferred embodiment, such that a seal is formed between the outer jacket 26 and the cables as shown in FIG. 4. These sealing means are disposed on the cables at positions which generally correspond to the ends of the outer jacket 26 and may be secured to the cables with tape, glue, etc.

After the outer jacket 26 has been placed about the cables 10 and 11, and the interlocking tracks 29 and 30 are secured, the outer jacket is filled with a liquid foam material 53 as shown in FIG. 8. In the presently preferred embodiment, the liquid foam material is a two part mixture, one part of which is a catalyst. The mixture begins to harden approximately 45 seconds after mixing. This has been found to be sufficient time to allow inject of the material 53 into the outer jacket 26 while it is still in a liquid state. Of course, the amount of time before hardening beings can be varied by using more or less catalyst. The liquid foam material 53 is disposed in injection means 54 and injected through the valve 27 into the interior of the outer jacket 26. Suitable liquid foam materials are well known in the art. They typically expand many times their original volume, and after curing, form a substantially rigid dielectric material.

Referring now to FIGS. 8 and 9, ports 56 and 57 are defined where the ends of the interlocking tracks 29 and 30 contact the gaskets 31 and 32. These ports allow entrapped air and gas to escape from the interior of the outer jacket 26 during the injection and expansion of the liquid foam material 53. Note, however, that air and gas can also escape through the gaskets depending on the material used in its manufacture. For example, if gaskets 31 and 32 are made of a sufficiently porous material, air and gas could pass therethrough. The gaskets also act as foam barriers which help contain the insulative foam material 53 within the outer jacket 26. Referring particularly to FIG. 10, one can see that insulative foam material 53 surrounds the inner cover 17 but does not come in contact with any conductors.

After the liquid foam material 53 has hardened, a protective grease material 59 is pumped into the inner cover 17 through tube 77 as shown in FIG. 8, filling the volume of space defined by the inner cover 17 and the cables 10 and 11. The space is known to be filled when grease material 59 begins to exude from tube 79. Because the insulative foam material 53 has expanded between the outer jacket 26 and the inner cover 17, the inner cover tends to tighten around the conductors, thereby reducing the space available for the protective grease material 59. Therefore, when the grease material 59 is pumped into the inner cover 17, a relatively small quantity is sufficient to completely surround and protect the conductors 13 and 14.

After the inner cover is filled with the protective grease material 59, tube 77 and 79 are plugged to prevent the grease material from exuding out of the inner cover. The tubes 77 and 79 may first be cut off abruptly against the gaskets 31 and 32 and then plugged to help prevent possible tangling or rupture of the tubes in the event the cable splice assembly is dragged along the ground.

In another embodiment, shown in FIG. 11, inner cover 17 is equipped with a tube 93 which communicates at one end with a second valve 90, disposed on the other jacket 26, and at its second end with the interior of the inner cover. Valve 90, in the presently preferred embodiment, has same construction as valve 27. Valve 90 is located approximately at the center of outer jacket 26 so that, when the jacket is in position, the valve 90 is directly over the spliced conductors. After the liquid foam material 53 is injected and has cured, the protective grease material 59, contained in an injection means 91, is injected into the interior space of inner cover 17. Thus, this second embodiment allows the protective grease material 59 to be injected directly into the inner cover 17 without restrictions, thereby insuring that the grease material will reach and completely surround the spliced conductors.

Any grease material which is non-miscible with water is suitable in the present invention. In addition, the grease material should have a viscosity which is sufficiently high so as not to tend to seep out of inner cover 17, and yet low enough to enable it to be injected into the cover. Polyethylene based grease materials have been found to be suitable for use in this invention. Moreover, a grease material having a variable viscosity, i.e., a viscosity which increases and decreases with corresponding changes in temperature, is preferred.

The liquid foam material 53 after hardening into a substantially rigid dielectric material, protects the cable splices from moisture and the like. In addition, the conductors 13 and 14, typically weakened by the splicing process, are now supported in the foam-filled assembly. Moreover, the insulative foam material 53 also compresses the inner cover 17 and conductors 13 and 14. This compression secures the conductors in place thereby preventing most movement in normal use.

It has been discovered that an insulative foam material alone is not sufficient to completely protect the exposed conductors from the elements. For example, entrapped air and moisture in the inner cover 17 may cause a weakening of the conductors by corrosion. Moisture can enter the inner cover 17 when the conductors are first spliced together or when the assembly is placed in the ground. Even the present splice assembly, without a protective material such as grease in the inner cover 17, is susceptible to moisture entering the inner cover. For example, if the present splice assembly, without any protective material in the inner cover 17, were buried in damp ground, moisture might enter the inner cover causing deterioration of the conductors 13 and 14. To prevent this, the present invention teaches the injection of a protective grease material into the inner cover 17. This helps insure that there is no air in the inner cover and also helps prevent any moisture from coming in contact with the exposed conductor.

While the presently preferred embodiment has been described with a single cable being coupled to another single cable, it will be apparent to one skilled in the art that two or more cables may be connected within the splice assembly. For example, two cables may be spliced to a third cable. The desired conductors on each of the respective cables are joined, and then the inner cover 17 and outer jacket 26 are placed over the cables. The two cables then pass through aperture 42 of jacket 26, while the third cable passes through aperture 44 thereof.

Thus, a lightweight, insulative splice assembly is disclosed which is relatively easy and fast to install and which provides greatly improved protection from the elements over prior art splice assemblies.

Although this invention has been disclosed and described with reference to a particular embodiment, the principles involved are susceptible of other applications which will be apparent to persons skilled in the art. This invention, therefore, is not intended to be limited to the particular embodiment herein disclosed.

I claim:

1. An electrical cable splice assembly protecting a plurality of spliced conductors in a cable comprising:

a. an inner cover disposed about said spliced conductors in said cable;
b. a protective grease material disposed within said inner cover;
c. an outer jacket disposed about said spliced conductors and said inner cover, said conductors passing through corresponding apertures in first and second ends of said outer jacket;
d. means sealing said apertures; and
e. an insulative foam material disposed within the space between said outer jacket and said inner cover;

whereby said splice assembly protects said conductors from the elements.

2. The assembly as defined in claim 1 wherein said inner cover has means securing said inner cover circumferentially about said conductors.

3. The assembly as defined in claim 1 wherein said inner cover is comprised of a generally elongated, flexible plastic member having a pair of interlocking tracks fixedly secured to corresponding edges along the length thereof, said tracks providing a means securing said inner cover circumferentially about said conductors.

4. The assembly as defined in claim 1 wherein the ends of said inner cover are taped to said cable.

5. The assembly as defined in claim 1 wherein said grease material is non-missible with water and has a viscosity low enough to enable it to be injected into said inner cover and high enough not to seep out.

6. The assembly as defined in claim 1 wherein said grease material has a variable viscosity, said viscosity varying directly with temperature.

7. The assembly as defined in claim 1 wherein said grease material is a polyethylene-based grease.

8. The assembly as defined in claim 1 wherein said outer jacket is comprised of a generally cylindrical, flexible plastic member, having a pair of interlocking tracks fixed secured to corresponding edges along the length thereof, said pair of tracks securing said jacket around said conductors and said inner cover.

9. The assembly as defined in claim 1 wherein said outer jacket has fixedly secured thereto, at least one valve arranged and configured to allow a fluid to pass from the exterior to the interior of said jacket.

10. The assembly as defined in claim 1 wherein said inner cover and said outer jacket are made of a material selected from the group consisting of polyvinyl chloride and polyolefin.

11. The assembly as defined in claim 1 wherein said means sealing said apertures in said outer jacket are circumferentially disposed about and secured to said cable at locations thereon generally corresponding to said first and second ends of said jacket.

12. The assembly as defined in claim 1 wherein said means sealing said apertures in said outer jacket are first and second strips of resilient material.

13. The assembly as defined in claim 12 wherein said injection means comprise two tubes, one end of each of said tubes being inserted into corresponding ends of said inner cover, and the second end of each of said tubes extending beyond the ends of said outer jacket.

14. The assembly as defined in claim 12 wherein said injection means comprises a tube disposed between said inner cover and outer jacket, one end of said tube being in communication with the interior of said inner cover, and the second end thereof being in communication with a valve on the exterior of said outer jacket.

15. The assembly as defined in claim 1 having, in addition thereto, means for injecting said protective grease material into said inner cover, said means being disposed between the interior of said inner cover, and the exterior of said assembly.

16. An electrical cable splice assembly protecting a plurality of spliced conductors in a cable comprising:
a. an inner cover comprised a generally elongated, flexible plastic member having a means securing said inner cover circumferentially about said spliced conductors;
b. a grease disposed within the enclosed volume of space defined by said inner cover and the conductors, said grease being non-missible with water and having a viscosity low enough to enable it to be injected into said inner cover and high enough not to seep out;
c. an outer jacket comprised of a generally cylindrical, flexible member, said conductors passing through corresponding apertures in said first and second ends thereof, said jacket have a means securing said outer jacket around said spliced conductors and said inner cover, said jacket having fixedly secured thereto at least one valve arranged and configured to allow a fluid to pass from the exterior to the interior of said jacket;
d. means for injecting said grease into said inner cover, said means being disposed between the interior of said inner cover and the exterior of said assembly;
e. means for sealing said apertures in said outer jacket, said means circumferentially disposed about and secured to said cable at locations thereon generally corresponding to said first and second ends of said jacket; and
f. an insulative foam material disposed within the space between said outer jacket and said inner cover;

whereby said splice assembly protects said conductors from the elements.

* * * * *